J. C. Andrew,
Feed Regulator.

No. 87,615.        Patented Mar. 9, 1869.

Witnesses,
Wm. A. Morgan
Philip C. Dietrich

Inventor,
J. C. Andrew
per Munn & Co.
Attorneys

JOHN C. ANDREW, OF SEVENTY-SIX, KENTUCKY.

*Letters Patent No. 87,615, dated March 9, 1869.*

IMPROVED FEEDING-SHOE FOR GRINDING-MILLS.

The Schedule referred to in these Letters Patent and making part of the same.

*To all whom it may concern:*

Be it known that I, JOHN C. ANDREW, of Seventy-Six, in the county of Clinton, and State of Kentucky, have invented new and useful Improvements in Feeding-Shoes for Grinding-Mills; and I do hereby declare that the following is a full, clear, and exact description thereof, which will enable those skilled in the art to make and use the same, reference being had to the accompanying drawings, forming part of this specification.

This invention relates to improvements in feeding-shoes for grinding-mills, the object of which is to arrange them so that they will also serve as sieves, for separating chess, dirt, or other foul matter.

It consists in constructing the bottom of the shoe of any suitable reticulated substance, through which the fine grains of foul matter may be separated from the good grain, and providing, under the said bottom, a spout for conveying it away, as will be hereinafter described.

Similar letters of reference indicate corresponding parts.

Figure 1:
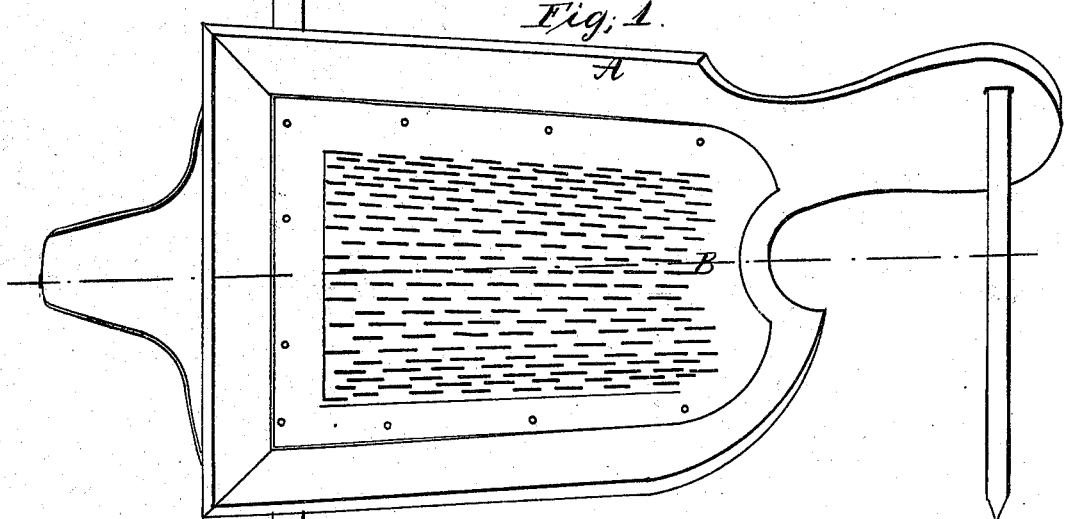
Figure 1 represents a plan view of my improved shoe.
Figure 2:
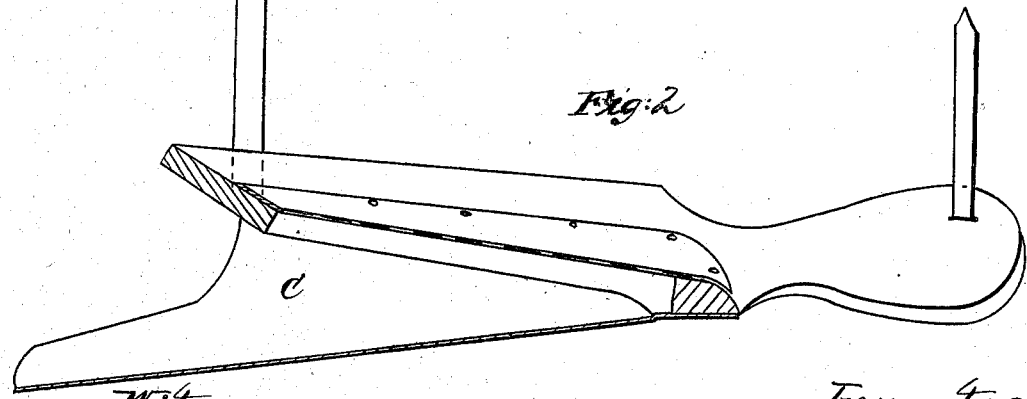
Figure 2 represents a longitudinal sectional elevation of the same.

A represents the feeding-shoe, made in the ordinary manner, except that the bottom, B, is made of perforated sheet-metal, or other reticulated substance, and C represents a spout, arranged under the said bottom, to receive the siftings from the reticulated bottom B, and convey them to any suitable receptacle.

As the shoe has a vibratory motion imparted to it while at work, and the grain passes over it in a thin volume, it affords, by this simple application, an excellent means of cleaning the grain.

I am aware of the patent granted to W. E. Wyche and Y. P. Dickson, dated July 7, 1868, for a hopper-shoe for grist-mills; but I claim nothing therein shown, as it forms no part of my invention.

I claim as new, and desire to secure by Letters Patent—

The sieve B and spout C, when the former composes the bottom of the shoe A, and the latter is rigidly attached to the under side of the same, both being arranged to conduct the grain and foreign matter in the manner described, for the purpose specified.

JOHN C. ANDREW.

Witnesses:
A. K. HAMON,
WILLIAM YATES.